(12) United States Patent
Goto et al.

(10) Patent No.: US 8,902,594 B2
(45) Date of Patent: Dec. 2, 2014

(54) ELECTROCHEMICAL CAPACITOR

(75) Inventors: Kyotaro Goto, Tokyo (JP); Naoto Hagiwara, Tokyo (JP); Katsuei Ishida, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 113 days.

(21) Appl. No.: 13/500,272

(22) PCT Filed: Aug. 31, 2010

(86) PCT No.: PCT/JP2010/064768
§ 371 (c)(1),
(2), (4) Date: Jun. 27, 2012

(87) PCT Pub. No.: WO2011/043138
PCT Pub. Date: Apr. 14, 2011

(65) Prior Publication Data
US 2012/0257357 A1    Oct. 11, 2012

(30) Foreign Application Priority Data

Oct. 5, 2009   (JP) .................. 2009-231585

(51) Int. Cl.
| | |
|---|---|
| *H05K 7/00* | (2006.01) |
| *H01G 11/72* | (2013.01) |
| *H01G 11/12* | (2013.01) |
| *H01G 11/80* | (2013.01) |
| *H01G 9/10* | (2006.01) |

(52) U.S. Cl.
CPC .......... *H01G 9/10* (2013.01); *H01G 11/72* (2013.01); *H01G 11/12* (2013.01); *H01G 11/80* (2013.01); *Y02E 60/13* (2013.01)
USPC .......... 361/728; 361/502; 361/521; 29/25.03; 29/25.41

(58) Field of Classification Search
USPC .............. 361/728, 502, 521; 29/25.03, 25.41; 252/62.2, 500; 429/82, 174, 171, 179
See application file for complete search history.

(56) References Cited

U.S. PATENT DOCUMENTS

| | | | |
|---|---|---|---|
| 2003/0172509 A1* | 9/2003 | Maletin et al. | ............... 29/25.03 |
| 2009/0197153 A1 | 8/2009 | Fujikawa et al. | |
| 2011/0045327 A1* | 2/2011 | Yawata et al. | ................... 429/82 |

FOREIGN PATENT DOCUMENTS

| | | |
|---|---|---|
| JP | 10-112297 | 4/1998 |
| JP | 10-112297 A | 4/1998 |

(Continued)

OTHER PUBLICATIONS

English Translation of the Yawata et al., WO 2009/136660 A1, dated Nov. 12, 2009, translated on Nov. 19, 2013.*

(Continued)

*Primary Examiner* — Robert J Hoffberg
*Assistant Examiner* — Michael Matey
(74) *Attorney, Agent, or Firm* — Pillsbury Winthrop Shaw Pittman, LLP (57) ABSTRACT

Disclosed is an electrochemical capacitor that can be reflow soldered, and wherein film package is used on the capacitor body. The container (20) of the electrochemical capacitor (ECC) stores the film package (11) of the capacitor body (10) within a storage space (SR) such that sealing sections (11a-11c) do not contact the inner surface of the storage space (SR). Inner material (30), which cover the sealing sections (11a-11c) and rear edge of the film package 11 and are adhered to the inner surface of the storage space (SR), affixing the film package (11) within the storage space (SR), are provided in a rectangular framework to the regions in the storage space (SR) of the container (20) that correspond to said sealing sections (11a-11c) and rear edge.

5 Claims, 7 Drawing Sheets

(56) References Cited

FOREIGN PATENT DOCUMENTS

| | | |
|---|---|---|
| JP | 2000-223085 | 8/2000 |
| JP | 2009-016549 | 1/2009 |
| JP | 2009-016549 A | 1/2009 |
| JP | 2009-182314 | 8/2009 |
| JP | 2009-188195 | 8/2009 |
| JP | 2009-188195 A | 8/2009 |
| JP | 2009-212081 | 9/2009 |
| JP | 2009-212081 A | 9/2009 |
| WO | WO 2009136660 A1 * | 11/2009 |

OTHER PUBLICATIONS

International Search Report and Written Opinion for PCT International Patent Application No. PCT/JP2010/064768, mailed on Nov. 22, 2010.
Chinese Office Action dated Dec. 20, 2013 of Chinese Patent Application No. 201080054441.X and English translation thereof (14 pages).
Written Opinion (Translation) dated Nov. 22, 2010 of PCT/JP2010/064768 filed Aug. 31, 2010 (5 pages).
Chinese Office action dated Jul. 11, 2014 for U.S. Appl. No. 201080054441.

* cited by examiner

ELECTROCHEMICAL CAPACITOR

CROSS REFERENCE TO RELATED APPLICATIONS

This application is a U.S. National Stage of PCT/JP2010/064768, filed Aug. 31, 2010, which in turn claims the benefit of priority from Japanese Patent Application No. 2009-231585, filed Oct. 5, 2009, the entire contents of which are incorporated herein by reference in their entirety.

BACKGROUND

The present invention relates to an electrochemical capacitor, and more specifically relates to an electrochemical capacitor enclosing a rechargeable and dischargeable electric storage element in a film package.

An electrochemical capacitor such as electric dual layer capacitor, lithium ion capacitor, and redox capacitor is preferably uses a film package rather than a metal package as a capacitor body for productivity and cost benefits. Such a film package is generally formed rectangular from a laminate film including a protective layer, barrier layer, and seal layer. A typical conventional film package is formed by folding a rectangular laminate film with a predetermined size such that each half of the folded seal layer faces with one another and then heating the outer rim of the folded laminate film to fusion bond the opposing seal layers. Such film packages may also be formed from two separate rectangular laminate films with a predetermined size by overlapping the seal layers of each of the laminate films with one another and heating the outer rim of the overlapped laminate films to fusion bond the seal layers.

In order to provide a compact circuit, reflow-solderable electrochemical capacitors are desired. Reflow-solderable electrochemical capacitors may be mounted on a circuit board by reflow-soldering like other types of electronic components (e.g., chip capacitors or chip registers). Reflow-soldering leads to not only a much improved productivity of mounting process but also cost reduction.

However, such a film package used for an electrochemical capacitor is generally susceptible reflow-soldering process. There are several disadvantages with conventional film packages to be subjected to reflow-soldering process. Such disadvantages include leakage of electrolyte or gas out of the film package through the sealing section due to an increased inner pressure within the film package or due to softening or melting of the sealing section.

In order to overcome those disadvantages, it is proposed in Japanese Patent Application Publication 2000-223085 (the "'085 Publication") to house a film package in a container to improve heat resistance of the film package. Another example to improve heat resistance of a film package is disclosed in Japanese Patent Application Publication 2009-182314 (the "'314 Publication") where a film package is covered with a rigid material.

The container described in the '085 Publication can delay heat conduction to the film package. However, if a temperature profile for reflow-soldering has a prolonged heating period, the temperature of the film package in the container can rise near the peak temperature (e.g., 260-280° C.), which could result in leakage of electrolyte or gas out of the film package through the sealing section as with film packages without such a container.

The rigid material described in the '314 Publication also can delay heat conduction to the film package. However, if a temperature profile for reflow-soldering has a prolonged heating period, the temperature of the film package in the container can rise near the peak temperature (e.g., 260-280° C.), which could generate cracks in the rigid material and damage the film package due to increased inner pressure in the film package.

LIST OF RELEVANT PATENT LITERATURE

Patent Literature 1: Japanese Patent Application Publication 2000-223085
Patent Literature 2: Japanese Patent Application Publication 2009-182314

SUMMARY

One object of the present invention is to provide a reflow-solderable electrochemical capacitor using a film package as a capacitor body.

In order to achieve the foregoing objects, an electrochemical capacitor according to one embodiment of the present invention comprises a capacitor body wherein rechargeable and dischargeable electric storage element and electrolyte are enclosed in a rectangular film package having sealing sections at least on three sides of its outer rim and one or more terminals electrically connected to the electric storage element are led out through one of the sealing sections. In one aspect, the electrochemical capacitor may include a storage space capable of housing the film package of the capacitor body. The electrochemical capacitor may include a container housing the film package in the storage space such that each of the sealing sections of the film package does not come into direct contact with the inner surface of the storage space. The electrochemical capacitor may comprise an inner material that is provided at least to the regions in the storage space of the container that correspond to said sealing sections of the film package so as to cover each of the sealing sections and be in intimate contact with to the inner surface of the storage space. An electrochemical capacitor in accordance with another aspect may include a package, an electronic component housed in the package, a container enclosing the package, and a thermosetting inner material. The package may be formed by joining a pair of sheets via corresponding thermoplastic sealing sections formed on at least the edge of their surfaces. The inner material may be disposed between at least a portion of the inner wall of the container and the sealing sections of the package so as to support the package and cover sealing sections of the package.

According to one embodiment of the present invention, since the film package of the capacitor body is housed in the storage space of the container, the container may delay heat conduction to the film package, thereby mitigating the increase in the inner pressure in the film package due to the increased vapor pressure of the electrolyte. The softening of the sealing sections may also be mitigated.

Since an electrochemical capacitor according to one embodiment of the present invention is configured such that each of the sealing sections of the film package of the capacitor body is covered by the inner material to reinforce the sealing capability, the covered portion may mitigate the leakage of the electrolyte or gas out of the film package through the sealing sections softened due to the increased inner pressure of the film package, even if a reflow-soldering process is carried out in accordance with a temperature profile having a prolonged heating period.

According to the present invention, a reflow-solderable electrochemical capacitor using a film package as a capacitor body may be provided.

DETAILED DESCRIPTION

Various embodiments of the present invention will be described below with reference to the accompanying drawings. For ease of describing, the direction toward the viewer, away from the viewer, left, right, top and bottom in FIG. 1(A) will be referred to as "top," "bottom," "front," "rear," "left," and "right" respectively, while the corresponding directions in other drawings are also referred to as "top," "bottom," "front," "rear," "left," and "right," respectively.

First Embodiment

FIGS. 1-6 show the first embodiment of the present invention. Electrochemical capacitor ECC shown in FIGS. 1-6 includes capacitor body 10, container 20, and inner material 30.

Figure 2:
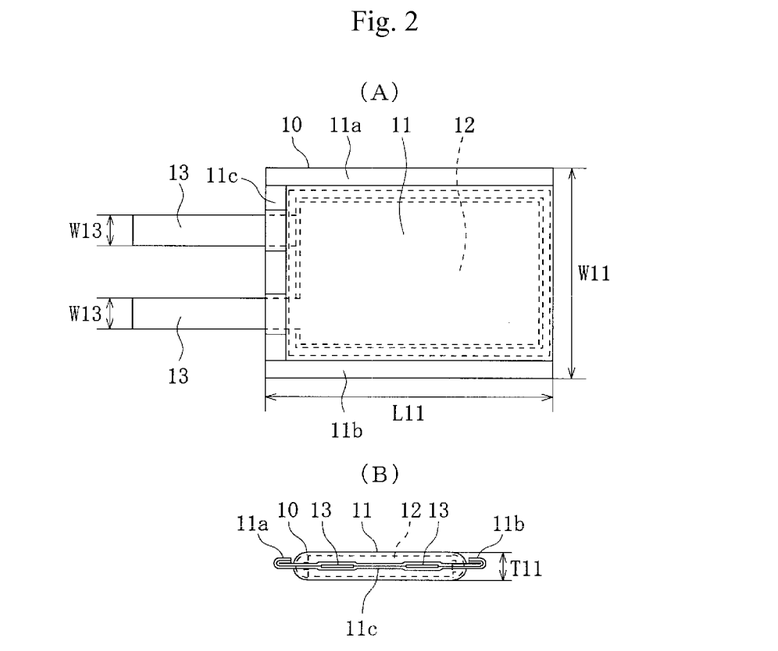
FIG. 2(A) shows a top view of the capacitor body of the electrochemical capacitor shown in FIG. 1.
FIG. 2(B) shows a front view of the capacitor body shown in FIG. 2(A).

First, with reference to FIGS. 2, 4 and 5, the capacitor body 10 will be described in greater detail. The capacitor body 10 is provided with film package 11, rechargeable and dischargeable electric storage element 12 encapsulated in the film package 11 together with an electrolyte (not shown), and a pair of terminals 13. The rear edge of each of the terminals 13 is electrically connected to the electric storage element 12, and the front edge of each of the terminals 13 is lead out of the film package 11.

The film package 11 is formed rectangular from a laminate film including a protective layer, barrier layer, and a seal layer. The film package 11 is formed by folding a rectangular laminate film in half such that each half of the folded seal layers faces with one another and then heating the three sides (i.e., left, right, and front sides) of the outer rim of the folded laminate film to fusion bond the opposing parts of the seal layer. That is, the left, right, and front edges of the rectangular laminate film are heated as the laminate film is folded in half. The heating process forms belt-like sealing sections 11a-11c on the left, right, and front sides of the outer rim of the film package 11 (i.e., left, right, and front edges of the film package 11), respectively. The sealing section 11c is formed continuously with the sealing section 11a and sealing section 11b. The length L11 of the film package 11 in the front-rear direction is slightly shorter than the length L21a of recess 21a of container component 21 (described below). The width W11 of the film package 11 in the left-right direction is slightly smaller than the width W21a of the recess 21a in the left-right direction. The height T11 of the film package 11 is slightly smaller than the twice of the depth D21a of the recess 21a.

The laminate film for the film package 11 is a three-layered laminate film formed by laminating a protective layer, a barrier layer and a seal layer in that order. The protective layer may be formed of thermoplastic material such as nylon or polyethylene phthalate, the thickness of which may be within 10-50 μm. The barrier layer may be formed of metal or metallic oxide such as aluminum, the thickness of which may be within 10-50 μm. The seal layer may be formed of thermoplastic material such as polypropylene or modified polypropylene, the thickness of which may be within 30-50 μm.

The electric storage element 12 may be formed by laminating one or more collecting electrode layers, one or more polarizable electrode layers, and one or more separate films in a predetermined order. More specifically, the electric storage element 12 may be formed by laminating collecting electrode layer 12a, polarizable electrode layer 12b, separate film 12c, polarizable electrode layer 12d, collecting electrode layer 12e, polarizable electrode layer 12f, separate film 12g, polarizable electrode layer 12h, and collecting electrode layer 12i, from top to bottom in that order, such that adjacent layers each comes into intimate contact with one another. Disposed integrally on the right side of the front edge of the collecting electrode layer 12e, which exists at the center in the laminating direction, is a rectangular terminal connection 12e1. In addition, terminal connections (reference number not shown) are integrally provided on the left side of the front edge of each of the collecting electrode layer 12a and 12i. The electric storage element 12 is enclosed in the film package 11 together with an electrolyte (not shown) such that each of the terminal connections faces forwardly.

The collecting electrode layers 12a, 12e and 12i of the collecting electrode layer, polarizable electrode layer, and separate film for the electric storage element 12 may be formed of conductive material such as aluminum or platinum, the thickness of which may be within 5-50 μm. The polarizable electrode layers 12b, 12d, 12f and 12h may be formed of active material such as PAS (polyacenic organic semiconductor) or active carbon, the thickness of which may be within 10-50 μm. The separate films 12c and 12g may be formed of ion conductive film such as cellulosic film or plastic film, the thickness of which may be within 10-50 μm.

A pair of terminals 13 may be formed in a strip shape. The length of each of the terminals 13 is larger than its width W13 in the left-right direction. The rear edge of one of the terminals 13 is electrically connected to the terminal connection 12e1 of the collecting electrode layer 12e of the electric storage element 12 using, for example, spot welding. Similarly, the rear edge of the other of the terminals 13 is electrically connected to the terminal connection of the collecting electrode layers 12a and 12i. The front edges of each of the terminals 13 are lead out of the film package 11 through the sealing section 11c formed on the front side of the film package 11 in parallel with one another.

The terminals 13 may be formed of conductive material such as aluminum or platinum, the thickness of which may be within 50-100 μm. The tip ends of each of the terminals 13 is provided with metal film which may be plated with metal such as tin or gold.

Now, a preferred manufacturing method of the capacitor body 10 shown in FIG. 2 will be described. First, a rectangular laminate film with a predetermined size is placed such that its seal layer faces upwardly. Next, electric storage element 12 provided with a pair of terminals 13 are placed on the seal layer such that each of the terminals 13 projects from the front or rear end of the rectangular laminate film. Then, the rectangular laminate film is folded in half along the center in the front-rear direction thereof such that each half of the folded seal layer faces with one another. Subsequently, the left and right parts of the outer rim (i.e., the left and right edges of the rectangular laminate film) are heated using an appropriate heating device to fusion bond the each halve of the folded seal layer so as to form left sealing section 11*a* and right sealing section 11*b*. That heating process produces a film package in pouched-shaped without having front sealing section 11*c*. Then, an electrolyte is poured into the thus-prepared pouched-shape film package through the opening formed on the front side of the film package. Next, the front portion of the outer rim (i.e., the front edge of the rectangular laminate film) using a similar heating device as described above to fusion bond the each halve of the folded seal layer so as to form front sealing section 11*c*. The electrolyte may be a liquid electrolyte prepared by mixing triethylmethylammonium fluoroborate with a propylene carbonate solvent or a gelatinous electrolyte prepared by mixing, for example, polyacrylonitrile with said liquid electrolyte. Thus, each of the terminals 13 is disposed between the upper and lower halves of the seal layer on the sealing section 11*c* and the front edges of each of the terminals 13 are lead out of the film package 11.

Figure 4:
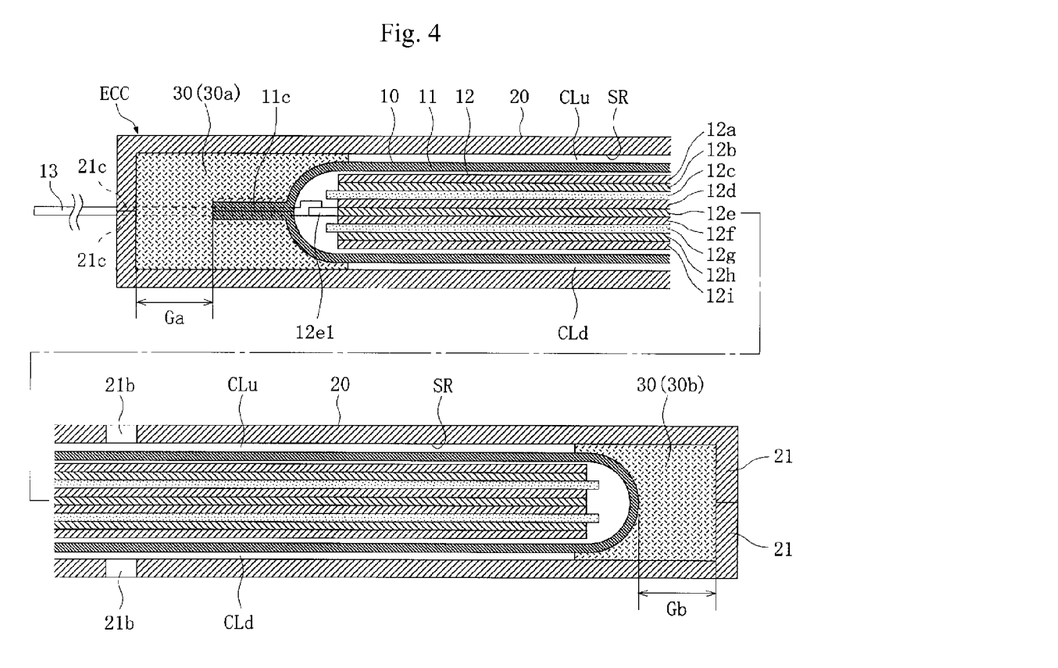
FIG. 4 shows an expanded sectional view along with S1-S1 Line in FIG. 1(A).
Figure 5:
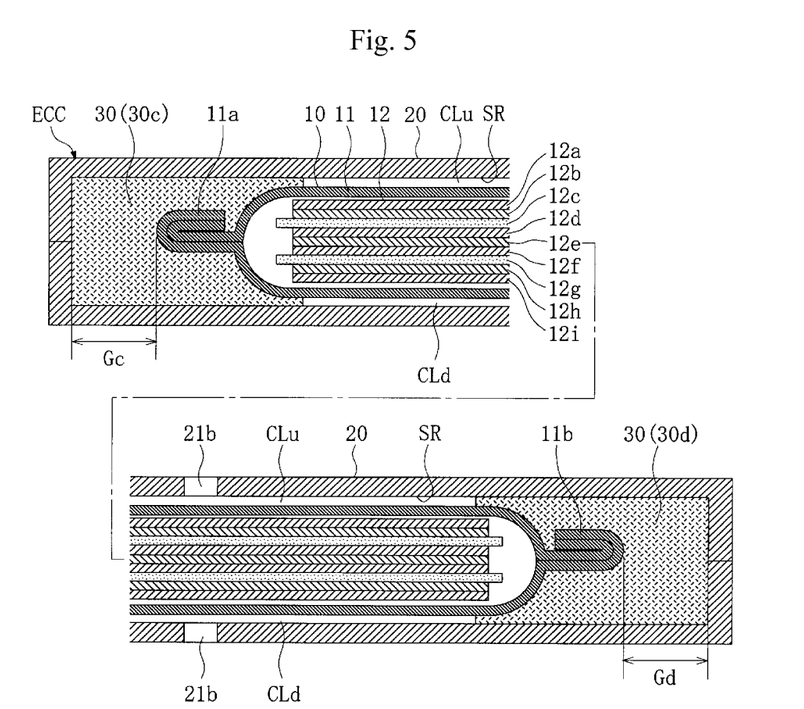
FIG. 5 shows an expanded sectional view along with S2-S2 Line in FIG. 1(A).

As shown in FIG. 5, the left sealing section 11*a* and right sealing section 11*b* is formed in U shape by first bending the planar portion, which is formed by fusion bonding the opposing halves of the seal layer as noted above, into U shape and then heating the bent portion. Thus prepared U shape structure may provide improved sealing performance. As shown in FIG. 4, the terminals 13 prevent the front sealing section 11*c* from being bent like the left sealing section 11*a* and right sealing section 11*b*. In one embodiment, auxiliary seal layer (not shown) may be provided around the front sealing section 11*c* on the terminals 13, thereby providing improved sealing performance of the front sealing section 11*c*. Such an auxiliary seal layer may prevent the terminals 13 from coming into contact with the barrier layer due to melt flow of the seal layer.

Figure 3:
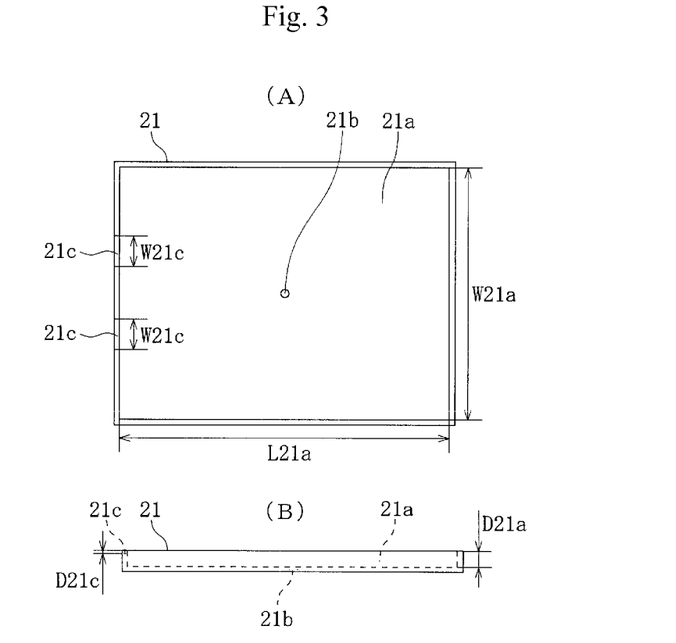
FIG. 3(A) shows a top view of a container component of the electrochemical capacitor shown in FIG. 1.
FIG. 3(B) shows a right side view of the container component shown in FIG. 3(A).

Next, with reference to FIGS. 1 and 3-5, the container 20 will be further described. The container 20 may be formed by combining two container components 21 as shown in FIG. 3.

The container component 21 includes rectangular bottom wall, front wall, rear wall, left wall and right wall, which are formed integrally with one another, as well as recess 21*a* formed rectangular in top view. As noted above, the length L21*a* of the recess 21*a* in the front and rear direction is slightly longer than the corresponding length L11 of the film package 11 of the capacitor body 10, the width W21*a* is slightly larger than the width W11 of the film package 11, and the depth D21*a* is slightly larger than the half of the height T11 of the film package 11. Vent 21*b* passing through the bottom wall is formed approximately at the center of the bottom wall (bottom wall of the recess 21*a*) of the container component 21. In addition, a pair of rectangular cutouts 21*c* is formed on the front wall upper surface of the container component 21 apart from each other by the distance corresponding to the distance between the pair of terminals 13. Each of the cutouts 21*c* has width W21*c* in the left-right direction slightly larger than the width 13 of the corresponding terminals 13 of the capacitor body 10.

The container component 21 may be formed of thermosetting plastics such as polyimide, epoxy resin or composite material thereof reinforced with glass fiber etc. (e.g., FRP), the thickness of the bottom wall, front wall, rear wall, left wall and right wall may be each within 100-300 μm. The container component 21 formed of polyimide or thermosetting plastics may provide improved heat resistance and higher stiffness than the film package 11 of the capacitor body 10. In addition, the container component 21 may be manufactured at low cost by using plastics molding. The diameter of the vent 21*b* is preferably within 0.3-1.0 mm so as to prevent inflow of heat.

The container 20 of FIGS. 4 and 5 may be formed by combining a pair of container components 21 such that the corresponding apertures and corresponding rectangular cutouts 21*c* thereof are aligned with each other. Thus combined container components 21 are joined by inner material 30 (described below), and, as such, rectangular parallelepiped storage space SR is formed within the container 20. The length of the storage space SR in the front-rear direction is represented by L21*a* and the width thereof in the left-right direction is represented by W21*a*. The depth of the storage space SR is twice as D21*a*. The aligned rectangular cutouts 21*c* form a pair of lead-out holes (reference number not shown) for the corresponding terminals 13 on the front wall of the container 20.

As shown in FIGS. 4 and 5, the storage space SR of the container 20 houses the film package 11 of the capacitor body 10 and the butt ends of the terminals 13, the tip ends of each of the terminals 13 is exposed to the outside of the container 20 through the corresponding lead-out holes defined by the rectangular cutouts 21*c*.

As noted above, the length L21*a* of the storage space SR of the container 20 in the front-rear direction may be slightly larger than the length L12 of the film package 11, the width W21*a* thereof in the left-right direction may be slightly larger than the width W12 of the film package 11, the depth D21*a* thereof may be slightly larger than the height T12 of the film package 11. The thus formed container 20 with the aforementioned size and shape may easily house the film package 11 of the capacitor body 10 within the storage space SR.

As shown in FIGS. 4 and 5, with the film package 11 fixed approximately at the center of the storage space SR using inner material 30 (described below), gap Ga is defined between the front edge of the film package 11 (front edge of the front sealing section 11*c*) and the front wall inner surface of the container 20, gap Gb is defined between the rear edge of the film package 11 and the rear wall inner surface of the container 20, gap Gc is defined between the left edge of the film package 11 (left edge of the left sealing section 11*a*) and the left wall inner surface of the container 20, and gap Gd is defined between the right edge of the film package 11 (left edge of the right sealing section 11*b*) and the right wall inner surface of the container 20. Thus, the film package 11 is housed in the storage space SR such that the sealing sections 11*a*-11*c* and rear edge of the film package 11 does not come into direct contact with the inner surface of the container 20.

In addition, clearance CLu is defined between the upper surface of the film package 11 and the top wall inner surface of the container 20, and clearance CLd is defined between the bottom surface of the film package 11 and the bottom wall inner surface of the container 20. Thus, the parts of the top and bottom surfaces of the film package 11 on which the inner material 30 is not provided does not come into contact with the inner surface of the container 20.

Moreover, the vent 21b formed on the top wall of the container 20 faces with the parts of the upper surface of the film package 11 on which the inner material 30 is not provided through the clearance CLu, the vent 21b formed on the bottom wall of the container 20 faces with the parts of the bottom surface of the film package 11 on which the inner material 30 is not provided through the clearance CLd. Thus, the clearances CLu and CLd formed in the storage space SR are each connected to the ambient air through the corresponding vent 21b.

Figure 1:
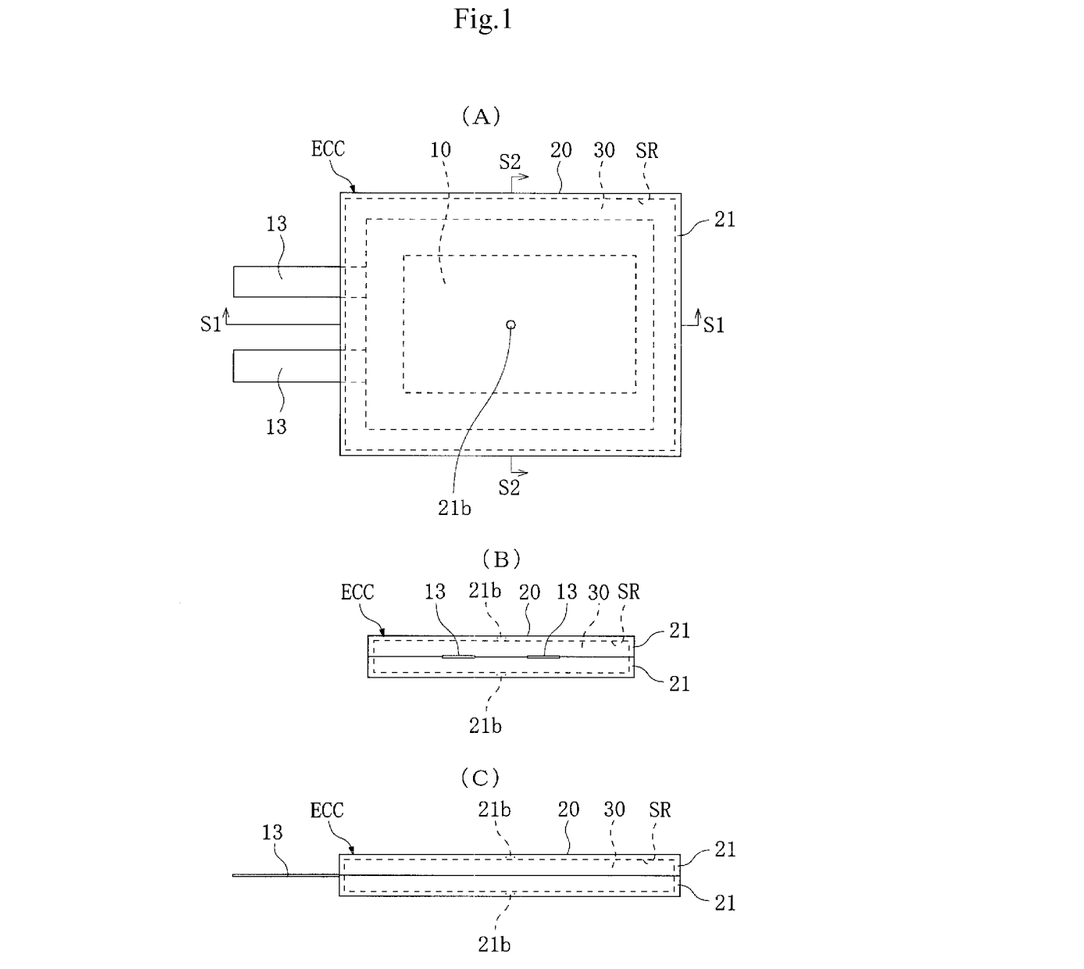
FIG. 1(A) shows a top view of an electrochemical capacitor according to the first embodiment of the present invention.
FIG. 1(B) shows a front view of the electric capacitor shown in FIG. 1(A)
FIG. 1(C) shows a right side view of the electric capacitor shown in FIG. 1(A).

Next, with reference to FIGS. 1, 4 and 5, the inner material 30 will be described in greater detail. The inner material 30 is provided to join the combined upper and lower container components 21 and fix the film package 11 of the capacitor body 10 within the storage space SR of the container 20.

The inner material 30 may be formed of thermosetting plastics such as polyimide, epoxy resin, or composite material thereof reinforced with glass fiber etc (e.g., FRP). The inner material 30 thus formed of polyimide or other types of thermosetting plastics may provide the film package 11 of the capacitor body 10 having improved heat resistance and higher stiffness. In addition, the inner material 30 enables the pair of container components 21 to be easily combined using a simple heating process to fix the film package 11.

As can be seen in FIGS. 4 and 5, the inner material 30 is formed in rectangular frame shape along the rear edge and sealing sections 11a-11c of the film package 11 in the storage space SR of the container 20.

In more detail, the part of the inner material 30 disposed on the front side of the film package 11 is in intimate contact with the bottom wall inner surface and front wall inner surface of the lower container component 21 as well as with the top wall inner surface and front wall inner surface of the upper container component 21 so as to cover the front sealing section 11c of the film package 11, the part of front side of the film package 11 adjacent inside to the front sealing section 11c, and the butt ends of each of the terminals 13. The part of the inner material 30 disposed on the rear side of the film package 11 is in intimate contact with the bottom wall inner surface and rear wall inner surface of the lower container component 21 as well as the top wall inner surface and rear wall inner surface of the upper container component 21 so as to cover the rear side of the film package 11. In addition, the part of the inner material 30 disposed on the left side of the film package 11 is in intimate contact with the bottom wall inner surface and left wall inner surface of the lower container component 21 as well as the top wall inner surface and left wall inner surface of the upper container component 21 so as to cover the left sealing section 11a of the film package 11 and parts the left side of the film package 11 adjacent inside to the left sealing section 11a. Furthermore, the part of the inner material 30 disposed on the right side of the film package 11 is in intimate contact with the bottom wall inner surface and right wall inner surface of the lower container component 21 as well as with the top wall inner surface and right wall inner surface of the upper container component 21 so as to cover the right sealing section 11b of the film package 11 and the parts of the right side of the film package 11 adjacent inside to the right sealing section 11b. Thus, the upper and lower container components 21 of the container 20 is joined by the inner material 30 and the film package 11 of the capacitor body 10 stored in the storage space SR of the container 20 is fixed by the inner material 30 within the storage space SR.

Figure 6:
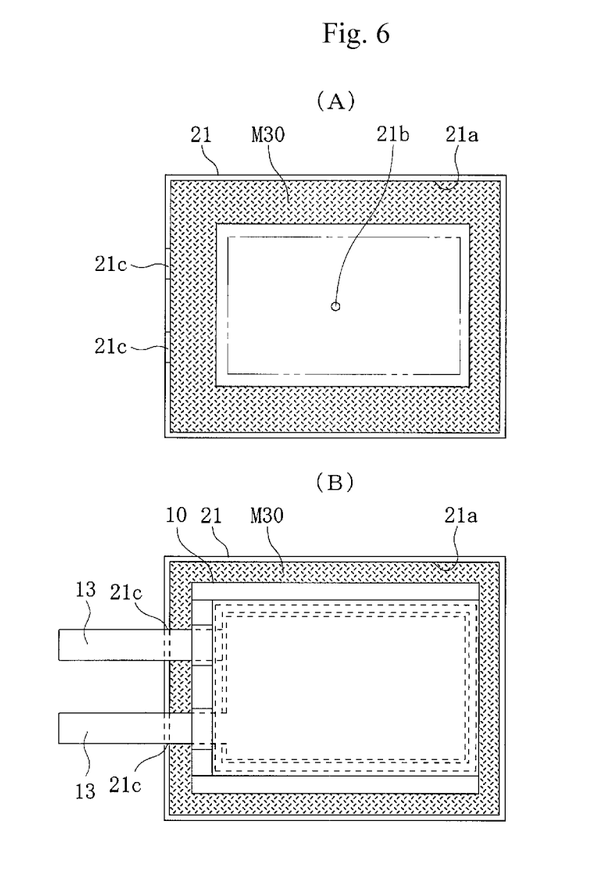
FIGS. 6(A) and 6(B) show one embodiment of a preferred manufacturing process of the electrochemical capacitor shown in FIG. 1.

Now, with reference to FIG. 6, a preferred manufacturing method of the electrochemical capacitor ECC shown in FIG. 1 will be described. First, capacitor body 10 shown in FIG. 2 and container component 21 shown in FIG. 3 are prepared.

Next, as shown in FIG. 6(A), a fluent inner material M30 is applied to the recess 21a of the lower container component 21 using an suitable coating device. The thus applied fluent inner material M30 is pushed downwardly by the film package 11 of the capacitor body 10 to spread toward the vent 21b (as shown in FIG. 6(A) by two-dot chain line). The amount of the fluent inner material M30 to be applied may be adjusted taking account of such spread of the inner material M30.

Subsequently, as shown in FIG. 6(B), the film package 11 of the capacitor body 10 is inserted in the recess 21a with the fluent inner material M30, each of the terminals 13 is inserted into the rectangular cutouts 21c, 21c, respectively. The film package 11 of the capacitor body 10 is disposed around the center of the recess 21a such that the gaps Ga, Gb, Gc and Gd are formed as shown in FIGS. 4 and 5.

Next, as with the lower container component 21 shown in FIG. 6(A), the fluent inner material M30 is applied to the recess 21a of the upper container component 21 and the upper container component 21 is combined with the lower container component 21 such that the aperture of the recess 21a of the upper container component 21 is aligned with that of the recess 21a of the lower container component 21 and the rectangular cutouts 21c of the upper container component 21 is aligned with the corresponding rectangular cutouts 21c of the lower container component 21.

Next, the thus combined upper and lower container components 21 is left at room temperature for a predetermined period to cure the fluent inner material M30. In case that the fluent inner material M30 is epoxy resin, the container components 21 is left at temperature of 100-150° C.

In the event that the fluent inner material M30 is leaked out of the container components 21 during the process of combining the lower container component 21 with the upper container component 21, it is preferable that the leaked portion of the fluent inner material M30 is eliminated before or after the curing of the fluent inner material M30.

Next, the behavior of the electrochemical capacitor ECC shown in FIG. 1 during mounting on a circuit board will be described, where the mounting process is carried out in reflow-soldering as with other electronic components such as chip capacitors or chip registers.

As with reflow-soldering for other electronic components, solder cream may be applied as necessary to the folded electrochemical capacitor ECC. Each of the terminals 13 of the folded electrochemical capacitor ECC is placed on corresponding pads via solder cream, and then the circuit board provided with the electrochemical capacitor ECC is loaded in a reflow furnace.

Since the film package 11 of the capacitor body 10 of the electrochemical capacitor ECC according to one embodiment of the present invention is housed within the storage space SR of the container 20, heat conduction to the film package 11 may be delayed by the container 20, thereby suppressing the increase of the inner pressure inside the film package 11 due to increased vapor pressure of the electrolyte and thereby preventing the seal portion of each of the sealing sections 11a-11c from softening using a temperature profile for reflow-soldering having a relatively shorter heating period. In one embodiment, the container 20 is formed of polyimide or thermosetting plastics having heat resistance, thereby achieving further suppressing the increase of the inner pressure of the film package 11 and further preventing the softening of the seal portions.

If the reflow-soldering process is carried our in accordance with a temperature profile having a prolonged heating period, the temperature of the film package 11 may increase up to the peak or near peak temperature (e.g., 260-280° C.). The increase of the temperature of the electrolyte may cause the vapor pressure of the electrolyte to increase accordingly and thereby may cause the inner pressure of the film package 11 to increase and cause the seal portions of the sealing sections 11a-11c to soften. However, since the electrochemical capacitor ECC according to one embodiment of the present invention is configured such that each of the sealing sections 11a-11c of the film package 11 of the capacitor body 10 is covered by the inner material 30 to reinforce the sealing capability, the covered portion may mitigate the leakage of the electrolyte or gas out of the film package 11 through the sealing sections 11a-11c even if the inner pressure of the film package 11 increases or the seal portions of the sealing sections 11a-11c soften. In addition, since the inner material 30 is formed of polyimide or thermosetting plastics, the inner material 30 may provide further improvement in heat resistance performance and stiffness to further suppress the leakage of the electrolyte or gas. Furthermore, since the gap Ga is formed between the front edge of the film package 11 (front edge of the front sealing section 11c) and the front wall inner surface of the container 20, the gap Gc is formed between the left edge of the film package 11 (left edge of the left sealing section 11a) and the left wall inner surface of the container 20, and the gap Gd is formed between the right edge of the film package 11 (left edge of the right sealing section 11b) and the right wall inner surface of the container 20, sufficient amount of inner material 30 may be disposed within those gaps Ga, Gc and Gd so as to robustly cover each of the sealing sections 11a-11c, thereby mitigating the leakage of the electrolyte or gas. Furthermore, not only each of the sealing sections 11a-11c but also the parts of the film package 11 adjacent inwardly to each of the sealing sections 11a-11c may be covered by the inner material 30, thereby further mitigating the leakage of the electrolyte or gas.

If the outermost layer of the film package 11 of a conventional electrochemical capacitor is formed of water-retentive material such as nylon, water vapor generated from the outermost layer may increase the inner pressure of the storage space SR of the container 20 to generate a sufficient pressure to crush the film package 11 and electric storage element 12. On the other hand, since the electrochemical capacitor ECC according to one embodiment of the present invention is configured such that the vent 21b of the top wall of the container 20 faces the parts of the upper surface of the film package 11 on which the inner material 30 is not provided through the clearance CLu and the vent 21b of the bottom wall of the container 20 faces with parts of the bottom surface of the film package 11 on which the inner material 30 is not provided through the clearance CLd, the water vapor generated from the outermost layer of the film package 11 may be easily released through the vents 21b to the ambient air, thereby mitigating the increase of the inner pressure in the storage space SR. Accordingly, it may be prevented that the increased inner pressure in the storage space SR generates a pressure to crush the film package 11 and electric storage element 12. If the outermost layer of the film package 11 generates no or little water vapor, then the vents 21b may release the expanded air in the storage space SR of the container 20 to the ambient air, thereby preventing excessive increase in the inner pressure in the storage space SR.

Thus, the electrochemical capacitor ECC in accordance with one embodiment of the present invention may be mounted on a circuit board by reflow soldering, as with other types of electronic components, without causing such problems as caused by the conventional electro chemical capacitors. Accordingly, an improved productivity and reduced production cost may be achieved in the mounting process of electrochemical capacitors.

Second Embodiment

Figure 7:
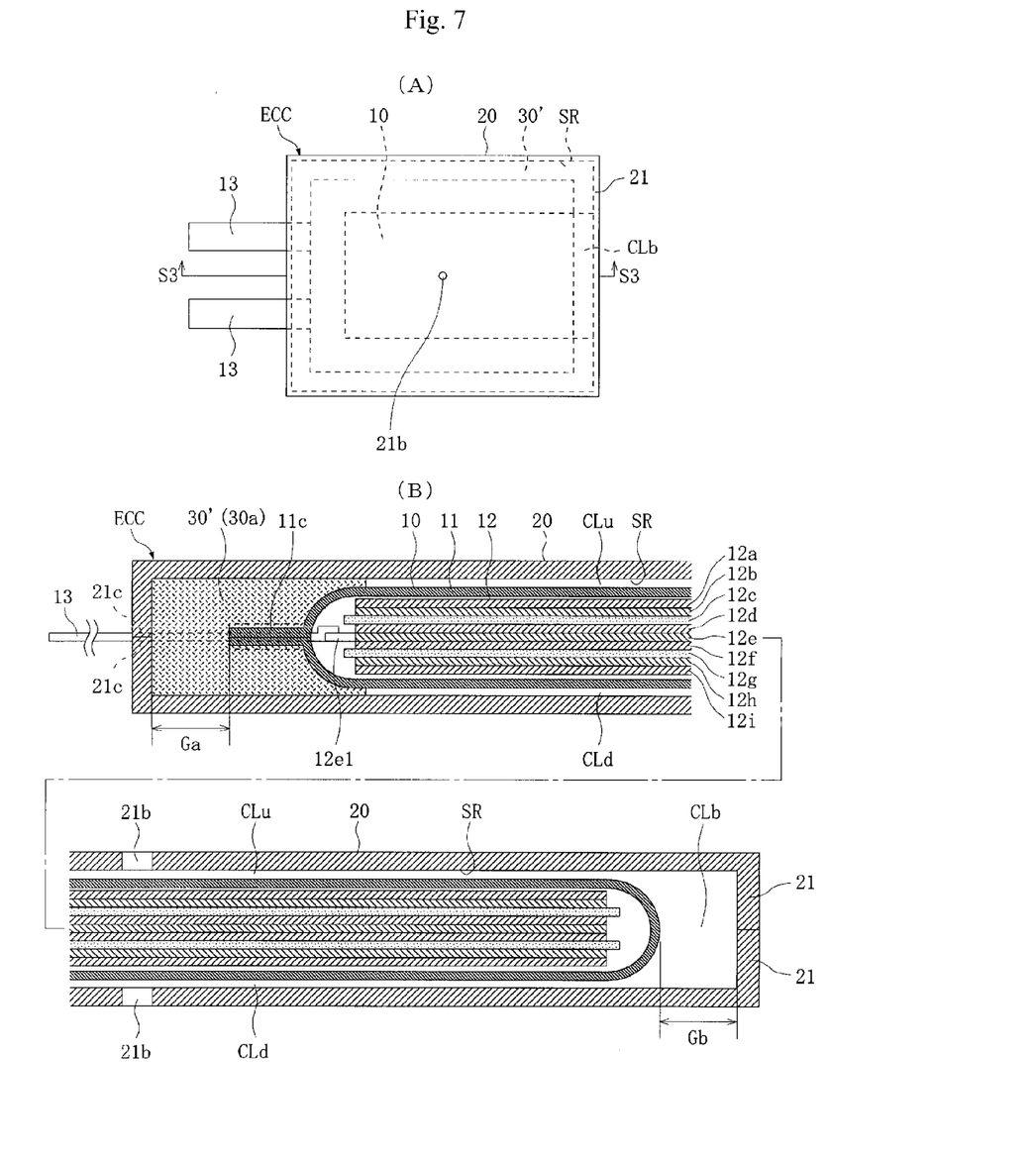
FIG. 7(A) shows a top view of an electrochemical capacitor according to the second embodiment of the present invention.
FIG. 7(B) shows an expanded sectional view along with S3-S3 Line in FIG. 7(A).

FIG. 7 shows the second embodiment of the present invention. The electrochemical capacitor ECC shown in FIG. 7 differs from that of the first embodiment in that the inner material 30' of the second embodiment is formed in C shape along with each of the sealing sections 11a-11c of the film package 11 in the storage space SR of the container 20.

The part of the inner material 30' disposed on the front side of the film package 11 is in intimate contact with the bottom wall inner surface and front wall inner surface of the lower container component 21 as well as with the top wall inner surface and front wall inner surface of the upper container component 21 so as to cover the front sealing section 11c of the film package 11, the part of front side of the film package 11 adjacent inside to the front sealing section 11c, and the butt ends of each of the terminals 13. The part of the inner material 30' disposed on the left side of the film package 11 is in intimate contact with the bottom wall inner surface and left wall inner surface of the lower container component 21 as well as the top wall inner surface and left wall inner surface of the upper container component 21 so as to cover the left sealing section 11a of the film package 11 and the parts the left side of the film package 11 adjacent inside to the left sealing section 11a. In addition, the part of the inner material 30' disposed on the right side of the film package 11 is in intimate contact with the bottom wall inner surface and right wall inner surface of the lower container component 21 as well as with the top wall inner surface and right wall inner surface of the upper container component 21 so as to cover the right sealing section 11b of the film package 11 and the parts of the right side of the film package 11 adjacent inside to the right sealing section 11b. Furthermore, clearance CLb is defined in rear of the film package 11 in such a manner as to connect to the clearances CLu and CLd since the inner material 30' is not disposed in that area.

As with the first embodiment, the inner material 30' may join the combined upper and lower container components 21 and fix the film package 11 of the capacitor body 10 within the storage space SR of the container 20. The electrochemical capacitor ECC shown in FIG. 7(A) may also achieve various advantageous effects in the process of mounting electronic component on a circuit board by reflow-soldering as with the first embodiment.

Other Embodiments

The size of each of the gaps Ga, Gb, Gc and Gd may differ from each other.

The size of each of the clearances CLu and CLd may also differ from each other. The size of each of the clearances CLu and CLd may be zero to the extent that the upper and bottom surfaces of film package 11 is not in intimate contact with the corresponding top wall inner surface and bottom wall inner surface of the container 20 and film package 11 so that water vapor may be smoothly released to the ambient air.

Two or more vents 21b may be provided on each of the container components 21. Since an increased number of vents 21b may result in inflow of heat, each of the diameters of the multiple vents 21b may be formed smaller than that of the single vent 21b as described in the first and second embodiments.

Figure 8:
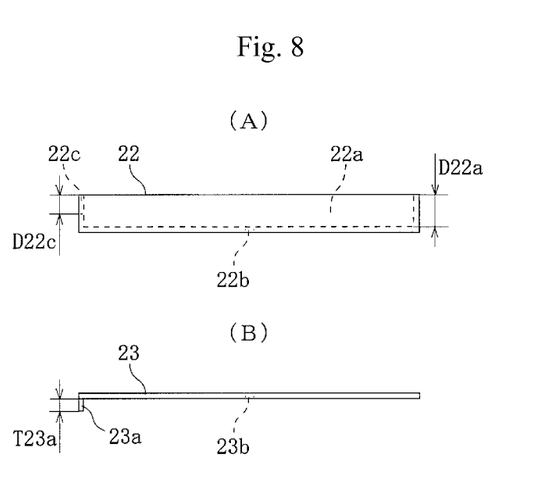
FIG. 8(A) shows a right side view of one of a pair of container components.
FIG. 8(B) shows a right side view of the other of the pair of container components.

Although the first and second embodiments each describes the two separate container components 21 shown in FIG. 3 to be combined to form the container 20, a pair of container components 22 and 23, which have different shapes from each other as shown in FIGS. 8(A) and 8(B), may be used to form the container 20.

The container component 22 shown in FIGS. 8(A) and 8(B) is formed in box shape including rectangular bottom wall, front wall, rear wall, left wall, and right wall. The container component 22 is formed rectangular in top view and provided with recess 22a having an aperture on its top surface. The length of the recess 22a in the front-rear direction is same as L21a shown in FIG. 3, the width of the recess 22a is same as W21a shown in FIG. 3, and the depth D22a is same as twice as D21a shown in FIG. 3. The size of each of the rectangular cutouts 22c in the left-right direction is same as W13 as shown in FIG. 3, and the depth D22c of each of the rectangular cutouts 22c is same as the sum of D21c and D21a shown in FIG. 3.

The container component 23 may be configured by eliminating the front, rear, left, and right walls from the container component 21 shown in FIG. 3. The container component 23 may be rectangular in top view. The container component 23 includes a pair of rectangular projections 23a, 23a formed integrally on the front edge bottom surface. The projections 23a, 23a are configured to be inserted into the corresponding rectangular cutouts 22c, 22c. The height of each of the projections 23a, 23a is same as D21a shown in FIG. 3. Vent 22b is formed approximately at the center of the bottom wall of the container component 22 (bottom wall of the recess 22a). Similarly, a vent 23b is formed approximately at the center of the container component 23. As noted above, two or more vents 22b and/or 23b may be provided.

A container having the same outer shape as the container 20 of the first and second embodiments may be obtained by combining the container component 22 and 23.

Although the film package 11 of the first and second embodiments may be obtained by folding in half a rectangular laminate film with a predetermined size such that each half of the folded seal layer faces one another and then heating three sides of the outer rim (i.e., left, right, and front sides) to fusion bond the opposing halves of the seal layer with each other, the film package 11 according to another embodiment of the present invention may be formed by overlapping two separate rectangular laminate films with a predetermined size such that the seal layers thereof face with each other and then heating the four sides of the outer rim (i.e., left, right, front, and rear sides) to fusion bond the seal layers. Thus prepared film package is provided with four belt-like seals continuously on each of the left, right, front and rear sides of the outer rim, and inner material 30 may be disposed on the film package as with the first embodiment in order to achieve similar advantageous effects to the electrochemical capacitor ECC of the first embodiment.

INDUSTRIAL APPLICABILITY

The present invention has industrial applicability to provide various electrochemical capacitors such as electric dual layer capacitors, lithium ion capacitors, or redox capacitors.

LIST OF REFERENCE NUMBERS

ECC . . . Electrochemical capacitor
10 . . . Capacitor body
11 . . . Film package
11a, 11b, 11c . . . Seal
12 . . . Electric storage element
13 . . . Terminal
20 . . . Container
21, 22, 23 . . . Container component
21b, 22b, 23b . . . Vent
SR . . . Storage space
30, 30' . . . Inner material
Ga, Gb, Gc, Gd . . . Gap
CLu, CLd, CLb . . . Clearance

What is claimed is:

1. An electronic component module comprising:
a package formed from a pair of sheets including one or more thermoplastic seal sections on its edge, the pair of sheets are bonded with each other via the one or more seal sections;
an electric storage element enclosed in the package together with an electrolyte;
a container housing the package;
an inner material disposed between a bonded part of the package and an inner wall of the container so as to support the package and to cover the bonded part of the package such that a first clearance is defined between an upper surface of the package and a top wall of the container and a second clearance is defined between a bottom surface of the package and a bottom wall of the container,
wherein the first and second clearances constitute an internal space of the container, the space being defined by the inner wall of the container, the package and the inner material; and
wherein at least one vent is formed on the container, said at least one vent connecting the internal space to outside of the container.

2. The electronic component module of claim 1, wherein the pair of sheets is formed by folding a single sheet.

3. The electronic component module of claim 1, wherein the pair of sheets are formed from two separate sheets.

4. The electronic component module of claim 1, wherein the package is supported by the inner material so as not to come into direct contact with the container.

5. The electronic component module of claim 1, wherein the electronic component is a capacitor including the electric storage element and the electrolyte.

\* \* \* \* \*